United States Patent
Scano

(10) Patent No.: US 11,796,296 B2
(45) Date of Patent: Oct. 24, 2023

(54) SELF-ADJUSTING PUSHROD LENGTH CHECKING TOOL

(71) Applicant: Michael Scano, West Islip, NY (US)

(72) Inventor: Michael Scano, West Islip, NY (US)

(*) Notice: Subject to any disclaimer, the term of this patent is extended or adjusted under 35 U.S.C. 154(b) by 366 days.

(21) Appl. No.: 17/236,681

(22) Filed: Apr. 21, 2021

(65) Prior Publication Data
US 2021/0333080 A1   Oct. 28, 2021

Related U.S. Application Data

(60) Provisional application No. 63/015,654, filed on Apr. 26, 2020.

(51) Int. Cl.
*G01B 5/00* (2006.01)

(52) U.S. Cl.
CPC .......... *G01B 5/003* (2013.01); *G01B 5/0032* (2013.01)

(58) Field of Classification Search
CPC .................................................. G01B 5/0032
See application file for complete search history.

(56) References Cited

U.S. PATENT DOCUMENTS

| | | | | |
|---|---|---|---|---|
| 1,390,272 A | * | 9/1921 | Brady | F01L 1/16 123/90.52 |
| 2,046,255 A | * | 6/1936 | Fisher | F01L 1/16 123/90.49 |
| 2,067,114 A | * | 1/1937 | Ashton | F01L 1/146 123/90.61 |
| 2,404,478 A | * | 7/1946 | Engemann | F01L 1/22 123/90.62 |
| 2,642,049 A | * | 6/1953 | Russell | F01L 1/22 123/90.62 |
| 2,706,973 A | * | 4/1955 | Russell | F01L 1/22 123/90.62 |
| 2,878,796 A | * | 3/1959 | Mannerstedt | F01L 1/10 123/90.55 |
| 3,002,508 A | * | 10/1961 | Barker | F01L 1/20 123/90.27 |
| 3,132,636 A | * | 5/1964 | Kliss | F01L 1/16 123/90.48 |
| 3,538,895 A | * | 11/1970 | Jensen | F01L 1/22 123/90.27 |
| 4,589,384 A | | 5/1986 | Ott | |
| 4,602,597 A | * | 7/1986 | Rhoads | F01L 13/0031 123/90.15 |
| 5,095,862 A | | 3/1992 | Murphy | |
| 5,154,145 A | | 10/1992 | Blane | |
| 5,507,100 A | | 4/1996 | Magnet | |

(Continued)

*Primary Examiner* — Christopher W Fulton
(74) *Attorney, Agent, or Firm* — Cittone Demers & Arneri LLP; Henry J. Cittone

(57) ABSTRACT

A self-adjusting pushrod length checking tool for use in an internal combustion engine between the camshaft lifter and valve rocker arm, that determines the optimum pushrod length using a telescoping spring-loaded body upper rod and a lower rod assembly. The spring-loaded telescoping assembly self-adjusts and determines the optimum pushrod length when compressed and inserted between the camshaft and valve rocker arm, when the rocker arm pivot bolt is fully tightened down to the cylinder head. The telescoping assembly sections are then locked by a captive set screw, the assembly is removed from the engine, and accurate measurements of the assembly length are taken.

8 Claims, 4 Drawing Sheets

(56) References Cited

U.S. PATENT DOCUMENTS

| | | | | |
|---|---|---|---|---|
| 6,854,436 B1 * | 2/2005 | English | .................. | F01L 1/146 |
| | | | | 123/90.62 |
| 8,201,340 B2 * | 6/2012 | Steffensen | ............. | G01C 15/06 |
| | | | | 33/809 |
| 10,125,642 B1 | 11/2018 | Godbold, Jr. | | |
| 2005/0115094 A1 | 6/2005 | Miller | | |

* cited by examiner

SELF-ADJUSTING PUSHROD LENGTH CHECKING TOOL

REFERENCE TO RELATED APPLICATIONS

This application claims priority to and benefit of U.S. Provisional Application No. 63/015,654 filed on Apr. 26, 2020, the entire contents of which are incorporated herein by reference, for all purposes.

FIELD OF THE INVENTION

The field of the invention relates in general to internal combustion engines and, more particularly, to pushrod length checking tools which measure the distance between a rocker arm and a camshaft, for determining the optimum pushrod length for the engine.

BACKGROUND OF THE INVENTION

In the operation of internal combustion automotive engines, the optimum length of the pushrods which connect the rocker arms to the camshaft is important to the engine's performance and valve timing. The optimum pushrod length is especially important in high performance modified engines having increased engine RPM. Modifying an engine with high lift performance camshafts changes the optimum pushrod length, which must then be determined so that the appropriate pushrods can be obtained and installed. Changing the cylinder head gasket thickness, and/or machining the engine block deck or the cylinder head, will also affect the optimum pushrod length, and these modifications accordingly will also require determination of the optimum pushrod length.

Pushrod length checking tools are available to determine the optimum pushrod length. Prior art pushrod checking tools include a threaded portion that allows the length of the tool to be adjusted by turning the threaded portion clockwise or anti-clockwise. The tool is inserted between the cam and the rocker arm, the lower end of the tool is rested on the cam, and the length is adjusted so as to achieve zero lash (no gap) between the tool tip and the valve rocker arm.

One disadvantage of the prior art pushrod length checking tools is that it is difficult for a technician to achieve zero lash via the manual threaded connection, because it relies on a trial and error method when adjusting the tool length longer and shorter. The proper tightness of fit that corresponds to zero lash is not quantified, and an accurate estimation of when zero lash is achieved depends on the experience of the operator. It is also difficult or impossible to adjust the threaded connection on certain cylinder heads due to the limited access provided by their design; in such cases the pushrod length checking tool needs to be removed, the length adjusted via the threaded connection, and the tool then reinstalled, with this procedure being repeated until a zero lash condition is obtained.

An alternative prior art tool uses a gauge with a threaded connection that is mounted to the cylinder head; this tool is often difficult or impossible to install due to the cylinder head design or configuration. Overall, the trial and error method of achieving zero lash with prior art pushrod length checking tools is a time-consuming manual process, which often produces less than perfect results.

Accordingly, a need exists for a new and improved pushrod checking tool which can easily and quickly be used to achieve zero lash and optimum pushrod length when a technician is setting up an engine valve train.

BRIEF SUMMARY OF THE INVENTION

The present invention provides an improved pushrod length checking tool that is self-adjusting in construction, which achieve zero lash and provides ease of use to determine optimum pushrod length while eliminating the manual threaded connection or mounted gauge and the time-consuming trial and error method.

Briefly summarized, the self-adjusting length pushrod checking tool comprises a spring-loaded assembly of a linear tubular body upper rod slidably engaged with an inserted linear lower rod. The spring-loaded assembly self-adjusts and determines the optimum pushrod length between the camshaft lifter and valve rocker arm when the rocker arm pivot bolt is fully tightened down to the cylinder head. The compressed spring-loaded assembly upper and lower sections are then locked in their relative positions by a set screw while the rocker arm pivot bolt is still fully tightened down. In this manner, the optimum pushrod length has been determined and the locked assembly can be removed from the engine so accurate measurements can be taken from it in order to manufacture or source optimum length engine running pushrods.

BRIEF DESCRIPTION OF THE OF THE DRAWINGS

DETAILED DESCRIPTION OF THE INVENTION

The self-adjusting pushrod length checking tool of the invention comprises a hollow upper rod, the hollow defining a cylindrical cavity open at one end and having a rim around the open end. The side of the upper rod is penetrated by a threaded opening for receiving a set screw or a captive set screw assembly, as described below.

The tool further comprises a lower rod comprising four segments of differing diameters. A stop segment has a diameter that permits the stop segment to be slidably insertable into the cavity of the upper rod; adjacent to this is a set screw contact segment having a diameter less than the diameter of the stop segment; a spring holding segment has the same diameter as the stop segment, and a terminal segment has an outer diameter larger than the stop segment or spring holding segments. This outer diameter is preferably the same, or substantially the same, as the diameter of the upper rod.

Fitted over the spring holding segment is a coil compression spring having an inner diameter sufficient to receive the spring holding segment, but not sufficient to receive either the rim of the upper rod or the terminal segment of the lower rod. The spring thus rests against the shoulder formed by the transition between the spring holding segment and the terminal segment.

A set screw may have threads that mate directly with the threaded opening in the upper rod, but is preferably part of a captive set screw assembly. The captive set screw assembly comprises a threaded insert having outer threads that mate with the threaded opening in the upper rod, and inner threads that mate with the threads of the set screw. A set screw retaining washer is held by a set screw retaining cap threaded over the outer threads of the threaded insert. The washer may be a compressible washer that holds the set screw by friction, or it may be a split ring washer or clip that rides in a circumferential groove in the set screw.

Figure 1:
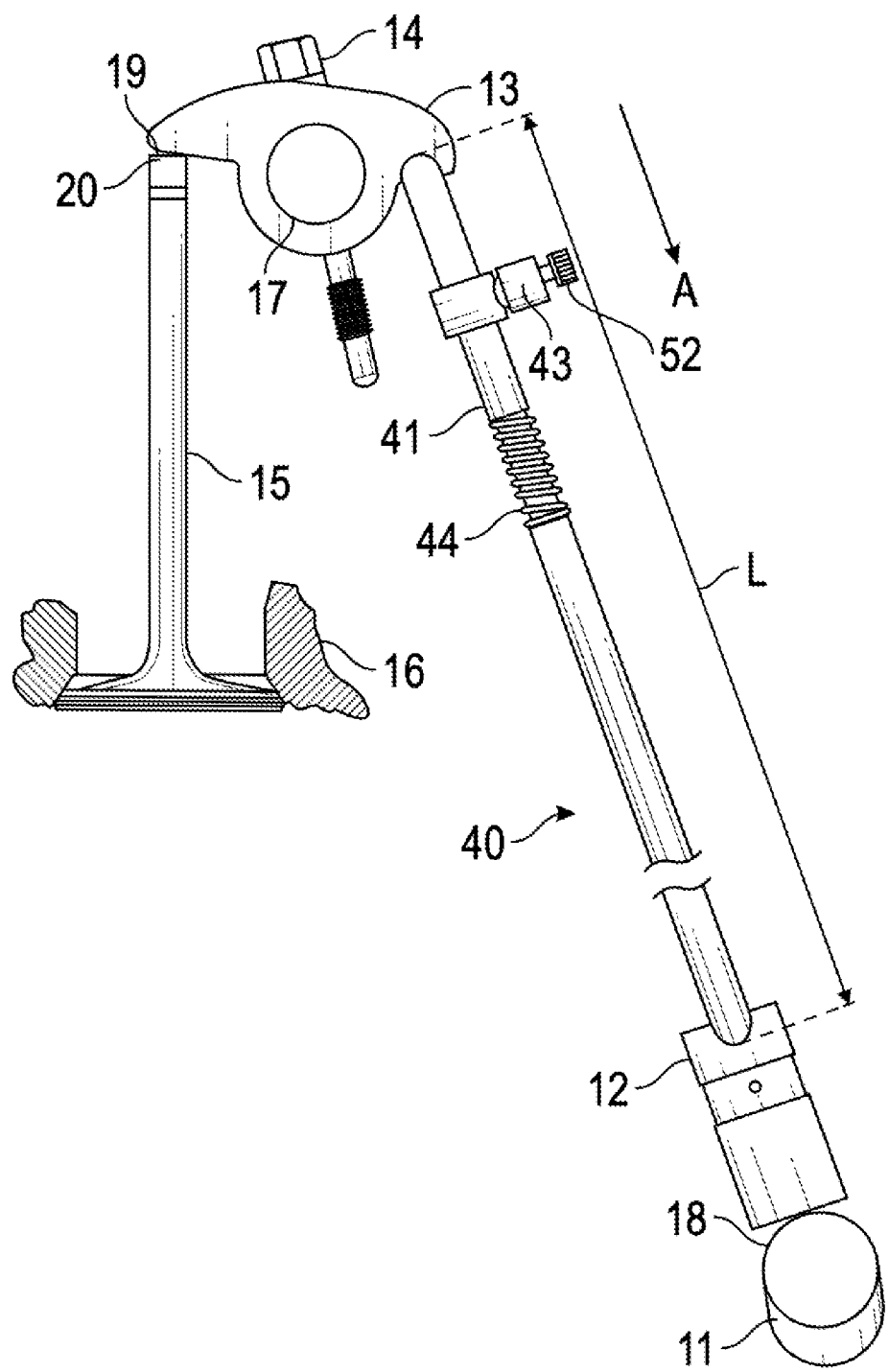
FIG. 1 is a side elevation view of a rocker arm and camshaft assembly, showing the tool of the invention being used according to the method of the invention.
Figure 2:
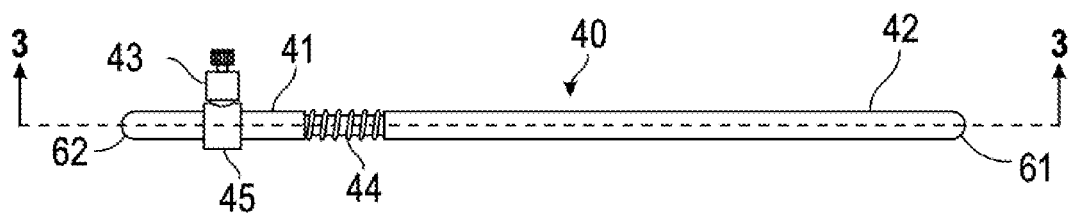
FIG. 2 is a side elevation view of the self-adjusting pushrod length checking tool of FIG. 1 in assembled form.
Figure 3:
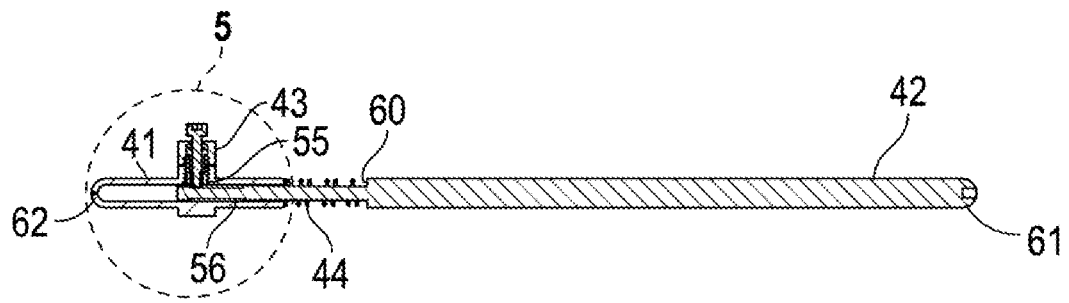
FIG. 3 is a lengthwise cross-sectional view of the self-adjusting pushrod length checking tool of FIG. 2, taken along line 10-10 thereof.

A representative embodiment of the improved pushrod length checking tool provided by the present invention is shown in FIG. 1. An example of a conventional rocker arm and camshaft assembly in an automobile engine is depicted. The engine components shown are a camshaft 18 having camshaft lobe 11, a camshaft lifter 12, a rocker arm 13, a rocker arm pivot bolt 14 and rocker arm trunnion 17, and a valve 15 (valve spring not shown) seated in a cylinder head 16 (partial view shown). A self-adjusting pushrod length checking tool 40 of the invention is shown inserted between the rocker arm 13 and camshaft lifter 12. The spring-loaded self-adjusting structure of tool 40 eliminates the need for the manually-adjusted threaded connection of the prior art.

The process of using the present invention to achieve zero lash or optimum pushrod length will now be described. As shown in FIG. 1, the camshaft lobe 11 is set to zero lift (lobe closed position) so that the lifter 12 rests on the lobe base of camshaft 18. A rocker arm 13 is installed on the cylinder head 16 using a rocker arm bolt 14, with the pushrod length checking tool 40 of the present invention installed between the rocker arm 13 and camshaft lifter 12, in the position normally occupied by a pushrod. In this configuration the captive set screw 52 is not tightened, so that the pushrod length checking tool 40 is held by spring 44 in an extended form.

The second step is to adjust the length of the pushrod length checking tool 40 by tightening down the rocker arm bolt 14 until the rocker arm trunnion 17 is seated against the cylinder head 16. As the rocker arm bolt 14 is tightened down the rocker arm 13 moves the upper rod 41 in the direction indicated by arrow A, thereby compressing the compression spring 44. In this configuration, the pushrod checking tool 40 has self-adjusted to a compressed length in which there is zero lash 19 between the valve tip 20 and valve rocker arm 13, and the optimum pushrod length L has been achieved. It is a feature of the present invention that the force applied in order to attain zero lash is set by the spring 44, and does not vary with the dexterity and experience of the technician. This provides a high degree of reproducibility, and ensures precision in the optimum length determinations.

In the third step, the captive set screw 52 is tightened to lock together the upper rod 41 and the lower rod 42, securing the tool 40 at the optimum pushrod length L.

In the fourth step, once the upper rod 41 and the lower rod 42 are locked together to form the optimum pushrod length L, the tool is removed from the engine so measurements can be taken from it to source permanent engine running pushrods.

In the embodiments shown in FIGS. 2-8, the self-adjusting pushrod length checking tool, indicated overall by 40, comprises an upper rod 41, a lower rod 42, a captive set screw assembly 43 and a compression spring 44. The upper rod 41 is of a linear, tubular body configuration having a circumferential collar 45 and a smooth inner surface 47 defined by a cavity or bore 46 which extends centrally within the upper rod 41 from a lower outward opening 48 at lower end 49 of the upper rod 41. The upper rod 41 has a perpendicular internally threaded hole 50 extending through collar 45 to the bore 46, in which a threaded insert 51, captive set screw 52, set screw retaining washer 53, and captive set screw retaining cap 54, are collectively threaded into when assembled form the captive set screw assembly 43. The captive set screw assembly 43 when threaded to the upper rod 41 forms a captive set screw retaining chamber 63 in which the set screw retaining washer 53 retains the captive set screw 52. The inward threaded end 55 of the captive set screw 52 threads into internal threads 64 of the threaded insert 51, which is aligned with the set screw contact segment 56 when the tool is assembled. Set screw 52 may be slotted for any common form of screwdriver bit, but is preferably provided with a hexagonal socket that permits tightening with a hex key. This enables operation in tight quarters, such as are found for example on General Motors' LS engines. In alternative embodiments, the set screw may be provided with a square or hexagonal bolt head, which permits tightening with a small wrench.

In a simplified embodiment of the invention, a non-captive set screw is threaded directly into the threaded hole 50 in the upper rod. This simplified embodiment is less costly, and may be preferred where the space around the pushrods and rockers is especially tight. Operation of this embodiment of the tool is identical to the operation of a tool with a captive set screw.

Figure 4:
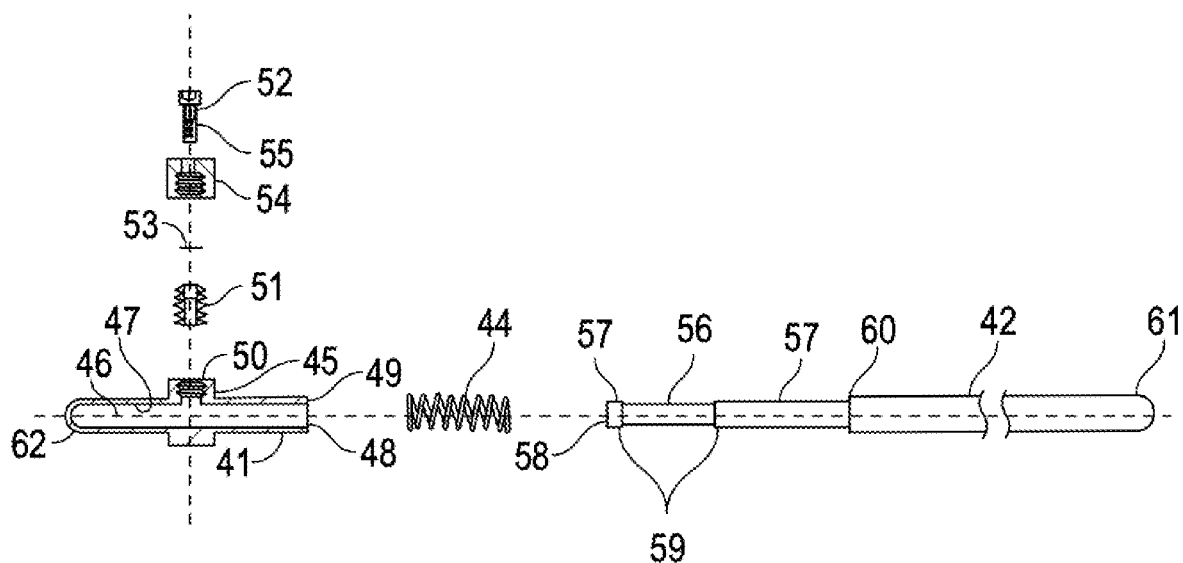
FIG. 4 is an exploded view of the self-adjusting pushrod length checking tool of FIGS. 2 and 3, partially in cross-section and partially in side elevation.
Figure 5:
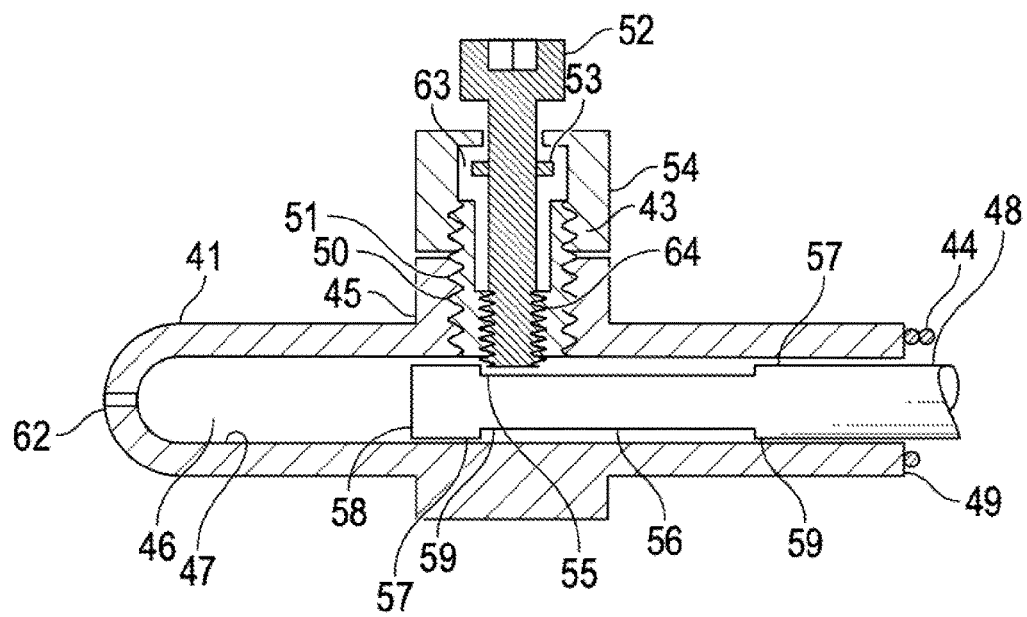
FIG. 5 is an exploded view of the upper rod, captive screw section and partial view of the lower rod.

Referring to FIG. 4, the lower rod 42 is a linear, preferably solid round diameter rod, which includes narrower diameter segments 57 sized to fit within the bore 46, such that the upper end 58 of the lower rod 42 is axially insertable through the spring 44, through the lower outward opening 48, and into the smooth bore 46 of the upper rod 41. The lower rod 42 includes a smaller diameter set screw contact segment 56, the shoulders of which serve as end stop positions 59 that limit the range of motion of the hex head captive set screw 52 to the length of set screw contact segment 56. The length of the section 56 thus defines the range of length adjustment. It will be appreciated that upper rod 41 and lower rod 42 are selected from the available lengths, such that the set screw 52 contacts set screw contact segment 56 when the tool is fitted to the engine as shown in FIG. 1.

A compression spring 44 is inserted over the lower rod narrower diameter section 57. The diameter of the spring is such that one end seats against the lower rod 42 spring shoulder 60 and the other end seats against the upper rod 41 outward opening 49. In this manner, the upper rod, lower rod and captive set screw assembly (41, 42, and 43) define a spring-loaded length self-adjusting pushrod checking tool 40 when so assembled.

The terminal, outward end 61 of the lower rod 42 is configured to mate with a camshaft lifter 12 for engagement with a camshaft lobe 11 and the upper, outward end 62 of the upper rod 41 is configured to mate to a rocker arm 13, as depicted in FIG. 1. Where the diameter of the tool is 5/16 inch, the ends of the tool are preferably rounded into hemispheres of 5/16 inch diameter, as shown in the figures. In alternative embodiments, steel balls of 5/16 inch diameter are welded or press-fitted to the ends of the tool.

In preferred embodiments, the outer diameter of the upper and lower rods 41 and 42 is 5/16 inch (about 0.3125 inches), the inner diameter of the cylindrical cavity 46 is about 0.238 inches, the diameter of the stop and spring-holding segments 57 is about 0.234 inches, and the diameter of the set screw contact segment 56 is about 0.200 inches. In this context, "about" should be understood to mean+/−10% of the indicated nominal value.

Figure 6:
FIG. 6 depicts a representative set of lower rods for selective use in the self-adjusting pushrod length checking tool of FIGS. 1-5.
Figure 6:
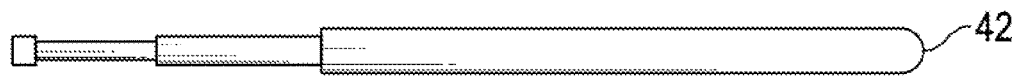
Figure 6:
Figure 7:
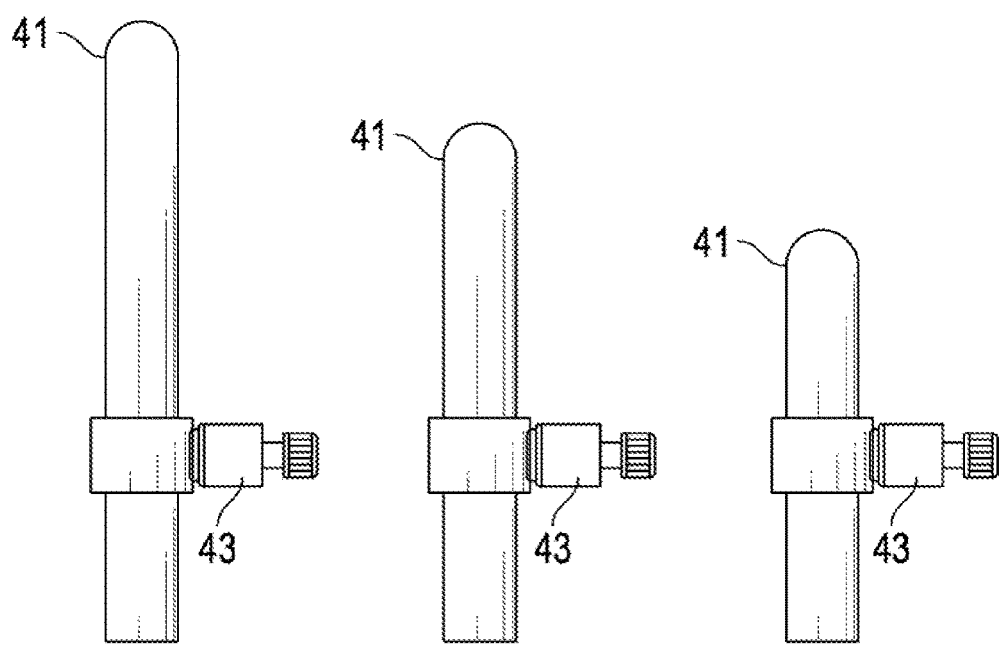
FIG. 7 depicts a representative set of upper rods and captive set screw section for selective use in the self-adjusting pushrod length checking tool of FIGS. 1-5.

A set of multiple lower rods 42 of different lengths, as representatively depicted in FIG. 6, and a set of multiple upper rods 41 of different lengths including a captive set screw assembly 43 representatively depicted in FIG. 7 are provided to enable use in different engine platforms.

Figure 8:
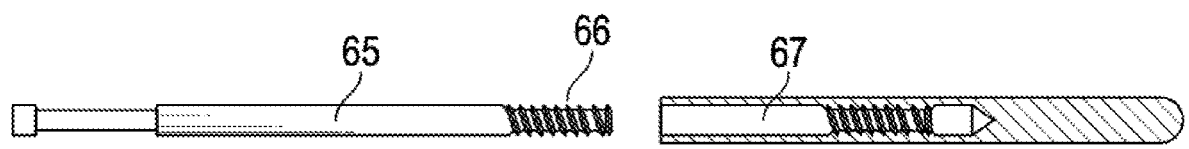
FIG. 8 depicts an alternative embodiment of the invention, in which an adapter enables the use of a lower rod from a prior art threaded length checking tool.

In the embodiment illustrated in FIG. 8, a lower rod adapter 65 includes an externally threaded end 66, the threads of which are engageable with the inner threads of a lower rod 67 of a prior art pushrod length checking tool. The outer diameter of the lower rod in this embodiment is preferably 0.25 inches, and the threads are preferably 1/4-20 size, as these dimensions will enable the adapter to fit most if not all prior art lower rods. This adapter enables a practitioner to upgrade an existing collection of different-length pushrod checking tools with the spring-loaded self-adjusting features of the present invention.

I claim:

1. A self-adjusting pushrod length checking tool, comprising:
   (a) a hollow upper rod, the hollow defining a cylindrical cavity open at one end and having a rim around the open end, the side of the upper rod having a threaded opening for receiving a set screw or captive set screw assembly;
   (b) a lower rod comprising four segments in the following order:
      (i) a stop segment having an intermediate diameter that permits the stop segment to be slidably insertable into the cavity of the upper rod;
      (ii) a set screw contact segment having a diameter less than the intermediate diameter;
      (iii) a spring holding segment having the intermediate diameter, and
      (iv) a terminal segment having an outer diameter larger than the intermediate diameter;
   (c) a coil compression spring having an inner diameter sufficient to receive the spring holding segment of the lower rod, and not sufficient to receive either the rim of the upper rod or the terminal segment of the lower rod; and
   (d) a set screw having threads that mate with the threaded opening in the upper rod.

2. The self-adjusting pushrod length checking tool according to claim 1, wherein the set screw is a component of a captive set screw assembly comprising:
   (a) a threaded insert having outer threads that mate with the threaded opening in the upper rod, and inner threads that mate with the threads of the set screw;
   (b) a set screw retaining washer;
   (c) a set screw retaining cap, threadable over the outer threads of the threaded insert; and
   (d) the set screw.

3. The self-adjusting pushrod length checking tool according to claim 2, wherein the outer diameter of the upper and lower rods is about 0.312 inches, the inner diameter of the cylindrical cavity is about 0.238 inches, the diameter of the set screw contact segment is about 0.200 inches, and the diameter of the spring holding segment is about 0.234 inches.

4. The self-adjusting pushrod length checking tool according to claim 2, wherein the outer diameter of the lower rod is 0.25 inches, and wherein the terminal segment of the lower rod terminates in a male thread.

5. The self-adjusting pushrod length checking tool according to claim 4, wherein the male thread is a male 1/4-20 thread.

6. The self-adjusting pushrod length checking tool according to claim 1, wherein the outer diameter of the upper and lower rods is about 0.312 inches, the inner diameter of the cylindrical cavity is about 0.238 inches, the diameter of the set screw contact segment is about 0.200 inches, and the diameter of the spring holding segment is about 0.234 inches.

7. The self-adjusting pushrod length checking tool according to claim 1, wherein the outer diameter of the lower rod is 0.25 inches, and wherein the terminal segment of the lower rod terminates in a male thread.

8. The self-adjusting pushrod length checking tool according to claim 7, wherein the male thread is a male 1/4-20 thread.

* * * * *